United States Patent
Baba et al.

(10) Patent No.: US 9,878,705 B2
(45) Date of Patent: Jan. 30, 2018

(54) HYBRID VEHICLE

(71) Applicant: TOYOTA JIDOSHA KABUSHIKI KAISHA, Toyota-shi, Aichi-ken (JP)

(72) Inventors: Masayuki Baba, Toyota (JP); Ichiro Isobe, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/491,022

(22) Filed: Apr. 19, 2017

(65) Prior Publication Data

US 2017/0313300 A1 Nov. 2, 2017

(30) Foreign Application Priority Data

Apr. 27, 2016 (JP) ................. 2016-089007

(51) Int. Cl.
| | | |
|---|---|---|
| *B60W 10/105* | (2012.01) | |
| *B60W 20/30* | (2016.01) | |
| *B60K 6/543* | (2007.10) | |
| *B60K 6/547* | (2007.10) | |
| *B60K 6/365* | (2007.10) | |

(Continued)

(52) U.S. Cl.
CPC .............. *B60W 20/30* (2013.01); *B60K 6/365* (2013.01); *B60K 6/387* (2013.01); *B60K 6/543* (2013.01); *B60K 6/547* (2013.01); *B60W 10/105* (2013.01); *B60W 10/115* (2013.01); *F16H 3/728* (2013.01); *B60W 2550/00* (2013.01); *B60W 2710/10* (2013.01); *B60Y 2200/92* (2013.01); *B60Y 2300/182* (2013.01); *B60Y 2400/72* (2013.01); *B60Y 2400/73* (2013.01); *F16D 67/04* (2013.01); *Y10S 903/911* (2013.01);

(Continued)

(58) Field of Classification Search
CPC .. B60W 10/105; B60W 10/115; B60W 20/30; F16H 3/728
See application file for complete search history.

(56) References Cited

U.S. PATENT DOCUMENTS

| | | | |
|---|---|---|---|
| 2008/0147284 A1* | 6/2008 | Tuckfield ................. | B60K 6/40 701/56 |
| 2014/0004994 A1* | 1/2014 | Wang ..................... | B60K 6/445 477/4 |

FOREIGN PATENT DOCUMENTS

JP      2006-321392 A      11/2006

OTHER PUBLICATIONS

U.S. Appl. No. 15/483,268, filed Apr. 10, 2017 in the name of Koki Minamikawa et al.

\* cited by examiner

*Primary Examiner* — Edwin A Young
(74) *Attorney, Agent, or Firm* — Oliff PLC

(57) ABSTRACT

A plurality of virtual gear positions are established by an electric continuously variable transmission, and the number of speeds of the virtual gear positions is equal to or larger than the number of speeds of mechanical gear positions of a mechanical stepwise variable transmission. One virtual gear position or two or more virtual gear positions is/are assigned to each mechanical gear position, and the mechanical gear position is shifted in the same timing as shift timing of the virtual gear position. The virtual gear positions assigned to each mechanical gear position when the mechanical gear position is upshifted are different from the virtual gear positions assigned to each mechanical gear position when the mechanical gear position is downshifted. Thus, the amount of heat generated in frictional engagement elements of the mechanical stepwise variable transmission is prevented from being increased.

7 Claims, 11 Drawing Sheets

(51) Int. Cl.
  *B60K 6/387* (2007.10)
  *B60W 10/115* (2012.01)
  *F16H 3/72* (2006.01)
  *F16D 67/04* (2006.01)
(52) U.S. Cl.
  CPC ........ *Y10S 903/914* (2013.01); *Y10S 903/918* (2013.01); *Y10S 903/919* (2013.01)

| MECHANICAL GEAR POSITION | CLUTCH | | BRAKE | |
|---|---|---|---|---|
| | C1 | C2 | B1 | B2 |
| 1ST SPEED | O | | | (O) |
| 2ND SPEED | O | | O | |
| 3RD SPEED | O | O | | |
| 4TH SPEED | | O | O | |

FIG. 7

| | VIRTUAL GEAR POSITION | 1ST SPEED | 2ND SPEED | 3RD SPEED | 4TH SPEED | 5TH SPEED | 6TH SPEED | 7TH SPEED | 8TH SPEED | 9TH SPEED | 10TH SPEED |
|---|---|---|---|---|---|---|---|---|---|---|---|
| UPSHIFT | MECHANICAL GEAR POSITION | 1ST SPEED | | | 2ND SPEED | | | 3RD SPEED | | | 4TH SPEED |
| DOWNSHIFT | VIRTUAL GEAR POSITION | 1ST SPEED | 2ND SPEED | 3RD SPEED | 4TH SPEED | 5TH SPEED | 6TH SPEED | 7TH SPEED | 8TH SPEED | 9TH SPEED | 10TH SPEED |
| | MECHANICAL GEAR POSITION | 1ST SPEED | | 2ND SPEED | | | 3RD SPEED | | | 4TH SPEED | |

FIG. 12

AUTOMATIC SHIFT MODE

| | VIRTUAL GEAR POSITION | 1ST SPEED | 2ND SPEED | 3RD SPEED | 4TH SPEED | 5TH SPEED | 6TH SPEED | 7TH SPEED | 8TH SPEED | 9TH SPEED | 10TH SPEED |
|---|---|---|---|---|---|---|---|---|---|---|---|
| UPSHIFT | MECHANICAL GEAR POSITION | 1ST SPEED | | | 2ND SPEED | | | 3RD SPEED | | | 4TH SPEED |
| DOWNSHIFT | VIRTUAL GEAR POSITION | 1ST SPEED | 2ND SPEED | 3RD SPEED | 4TH SPEED | 5TH SPEED | 6TH SPEED | 7TH SPEED | 8TH SPEED | 9TH SPEED | 10TH SPEED |
| | MECHANICAL GEAR POSITION | 1ST SPEED | | | 2ND SPEED | | | 3RD SPEED | | | 4TH SPEED |

FIG. 13

MANUAL SHIFT MODE

| | VIRTUAL GEAR POSITION | 1ST SPEED | 2ND SPEED | 3RD SPEED | 4TH SPEED | 5TH SPEED | 6TH SPEED | 7TH SPEED | 8TH SPEED | 9TH SPEED | 10TH SPEED |
|---|---|---|---|---|---|---|---|---|---|---|---|
| UPSHIFT | MECHANICAL GEAR POSITION | 1ST SPEED | | | 2ND SPEED | | | 3RD SPEED | | | 4TH SPEED |
| DOWNSHIFT | VIRTUAL GEAR POSITION | 1ST SPEED | 2ND SPEED | 3RD SPEED | 4TH SPEED | 5TH SPEED | 6TH SPEED | 7TH SPEED | 8TH SPEED | 9TH SPEED | 10TH SPEED |
| | MECHANICAL GEAR POSITION | 1ST SPEED | | 2ND SPEED | | | 3RD SPEED | | | 4TH SPEED | |

FIG. 14

AUTOMATIC SHIFT MODE

| | VIRTUAL GEAR POSITION | 1ST SPEED | 2ND SPEED | 3RD SPEED | 4TH SPEED | 5TH SPEED | 6TH SPEED | 7TH SPEED | 8TH SPEED | 9TH SPEED | 10TH SPEED |
|---|---|---|---|---|---|---|---|---|---|---|---|
| UPSHIFT | MECHANICAL GEAR POSITION | | 2ND SPEED | | | | | 3RD SPEED | | | 4TH SPEED |
| DOWNSHIFT | VIRTUAL GEAR POSITION | 1ST SPEED | 2ND SPEED | 3RD SPEED | 4TH SPEED | 5TH SPEED | 6TH SPEED | 7TH SPEED | 8TH SPEED | 9TH SPEED | 10TH SPEED |
| | MECHANICAL GEAR POSITION | | 2ND SPEED | | | | | 3RD SPEED | | 4TH SPEED | |

FIG. 15

MANUAL SHIFT MODE

| | VIRTUAL GEAR POSITION | 1ST SPEED | 2ND SPEED | 3RD SPEED | 4TH SPEED | 5TH SPEED | 6TH SPEED | 7TH SPEED | 8TH SPEED | 9TH SPEED | 10TH SPEED |
|---|---|---|---|---|---|---|---|---|---|---|---|
| UPSHIFT | MECHANICAL GEAR POSITION | 1ST SPEED | | | 2ND SPEED | | | 3RD SPEED | | | |
| DOWNSHIFT | VIRTUAL GEAR POSITION | 1ST SPEED | 2ND SPEED | 3RD SPEED | 4TH SPEED | 5TH SPEED | 6TH SPEED | 7TH SPEED | 8TH SPEED | 9TH SPEED | 10TH SPEED |
| | MECHANICAL GEAR POSITION | 1ST SPEED | | 2ND SPEED | | | 3RD SPEED | | | | |

HYBRID VEHICLE

INCORPORATION BY REFERENCE

The disclosure of Japanese Patent Application No. 2016-089007 filed on Apr. 27, 2016 including the specification, drawings and abstract is incorporated herein by reference in its entirety.

BACKGROUND

1. Technical Field

The disclosure relates to a hybrid vehicle. In particular, the disclosure is concerned with a hybrid vehicle including a power transmission system in which an electric continuously variable transmission and a mechanical stepwise variable transmission are connected in series.

2. Description of Related Art

A hybrid vehicle including a power transmission system in which an electric continuously variable transmission and a mechanical stepwise variable transmission are connected in series is known, as disclosed in Japanese Patent Application Publication No. 2006-321392 (JP 2006-321392 A). The electric continuously variable transmission can steplessly change the rotational speed of a drive source (an engine) through torque control of a differential rotating machine (a first motor-generator), and transmit torque from the drive source to an intermediate transmission member as an output-side member of the electric continuously variable transmission. The mechanical stepwise variable transmission is disposed between the intermediate transmission member and drive wheels, and can mechanically establish a plurality of gear positions (which may be called "mechanical gear positions") having different ratios (speed ratios) of the rotational speed of the intermediate transmission member to the output rotational speed. The mechanical stepwise variable transmission includes two or more frictional engagement elements, and switches power transmission paths by switching engagement and release of selected ones of these frictional engagement elements, so as to establish a given mechanical gear position.

According to a technology described in JP 2006-321392 A, in order to curb occurrence of shift shock due to change of the rotational speed in the inertia phase, during shifting of the mechanical stepwise variable transmission, the speed ratio of the electric continuously variable transmission is changed while the rotational speed of the drive source is kept substantially constant, so that the inertia phase of the mechanical stepwise variable transmission is started.

SUMMARY

However, it is difficult to completely prevent shift shock during shifting of the mechanical stepwise variable transmission, even under the shift control disclosed in JP 2006-321392 A, and even a slight shock due to a shift of the mechanical stepwise variable transmission may cause the driver to feel strange or uncomfortable, since the rotational speed of the drive source is substantially constant.

The inventors of this disclosure have considered how to reduce the feeling of strangeness given to the driver due to shift shock of the mechanical stepwise variable transmission.

The inventors of this disclosure propose the technology as follows: the electric continuously variable transmission is controlled so that a plurality of virtual gear positions (simulated gear positions) having different speed ratios as the ratios of the rotational speed of the drive source to the rotational speed of the intermediate transmission member can be established. Namely, the electric continuously variable transmission is controlled in a manner simulating control of the stepwise variable transmission. Also, the number of speeds of the virtual gear positions is set to be equal to or larger than the number of speeds of the mechanical gear positions. Also, one virtual gear position or two or more virtual gear positions are assigned to each mechanical gear position so as to be established when the mechanical gear position is established. Then, shift conditions of each mechanical gear position (conditions under which the mechanical stepwise variable transmission is shifted) are matched with shift conditions of any one of the virtual gear positions (conditions under the electric continuously variable transmission is shifted), so that the shift timing of the mechanical gear position coincides with the shift timing of the virtual gear position (the electric continuously variable transmission is shifted when the mechanical stepwise variable transmission is shifted). In this manner, shift shock caused by a shift of the mechanical gear position is blended into shift shock caused by a shift of the virtual gear position, and the driver is less likely or unlikely to feel strange or uncomfortable since shift shock does not occur solely due to a shift of the mechanical stepwise variable transmission.

However, in the case where the shift conditions of the mechanical gear position are matched with the shift conditions of the virtual gear position as described above, if the shift conditions are satisfied, and the electric continuously variable transmission is repeatedly shifted between two virtual gear positions (upshift and downshift are repeated in a short period of time), upshift and downshift of the mechanical gear position of the mechanical stepwise variable transmission would also be repeated in a short time in accordance with those of the virtual gear position. When upshift and downshift of the mechanical gear position are repeated in a short time, engagement and release of the frictional engagement elements are repeated in a short time, and the amount of heat generated in the frictional engagement elements may be increased. As a result, the durability of the frictional engagement elements may be adversely influenced.

The disclosure has been developed in view of the above points, and its object is to provide a shift control system of a vehicle including a power transmission system in which an electric continuously variable transmission and a mechanical stepwise variable transmission are connected in series, which system is able to reduce the amount of heat generated in frictional engagement elements of the mechanical stepwise variable transmission, while suppressing or reducing the feeling of strangeness given to the driver due to shift shock of the mechanical stepwise variable transmission.

One aspect of the disclosure is a hybrid vehicle. The hybrid vehicle includes a power transmission system, and an electronic control unit. The power transmission system includes an electric continuously variable transmission, and a mechanical stepwise variable transmission. The electric continuously variable transmission is configured to steplessly change a rotational speed of a drive source by torque control of a differential rotating machine, and transmit a changed rotational speed of the drive source to an intermediate transmission member. The mechanical stepwise variable transmission includes frictional engagement elements. The mechanical stepwise variable transmission is disposed between the intermediate transmission member and drive wheels. The mechanical stepwise variable transmission is configured to mechanically establish a plurality of mechanical gear positions by selectively switching engagement and release of the frictional engagement elements. The plurality of mechanical gear positions is gear positions that have different ratios of a rotational speed of the intermediate transmission member to an output rotational speed. The power transmission system is configured such that the electric continuously variable transmission and the mechanical stepwise variable transmission are connected in series. The electronic control unit is configured to control the electric continuously variable transmission such that one virtual gear position selected from a plurality of virtual gear positions is established according to predetermined virtual gear position shift conditions. The plurality of virtual gear positions is gear positions that have different ratios of a rotational speed of the drive source to the rotational speed of the intermediate transmission member. The electronic control unit is configured to selectively switch engagement and release of the frictional engagement elements such that one mechanical gear position selected from the plurality of mechanical gear positions is established according to predetermined mechanical gear position shift conditions. The number of speeds of the plurality of virtual gear positions is equal to or larger than the number of speeds of the plurality of mechanical gear positions. At least one virtual gear position is assigned to each of the mechanical gear positions. The mechanical gear position shift conditions of each of the mechanical gear positions are identical with the virtual gear position shift conditions of one of the plurality of virtual gear positions. A first given virtual gear position is different from a second given virtual gear position. The first given virtual gear position is a virtual gear position that assigned to each of the mechanical gear position when the mechanical gear position is upshifted. The second given virtual gear position is a virtual gear position that assigned to each mechanical gear position when the mechanical gear position is downshifted.

With the above arrangement, the shift conditions of each of the mechanical gear positions are identical with the shift conditions of one of the plurality of virtual gear positions; therefore, when the mechanical gear position is shifted (the mechanical stepwise variable transmission is shifted, the virtual gear position is also shifted (the electric continuously variable transmission is also shifted). As described above, shift shock caused by a shift of the mechanical gear position is blended into shift shock caused by a shift of the virtual gear position, and the driver is less likely or unlikely to feel strange or uncomfortable since shift shock does not occur solely due to the shift of the mechanical stepwise variable transmission. Then, with the above arrangement, the virtual gear positions assigned to each mechanical gear position when the mechanical gear position is upshifted are different from the virtual gear positions assigned to each mechanical gear position when the mechanical gear position is downshifted. Therefore, even when the virtual gear position is repeatedly shifted between two gear positions (even when upshift and downshift are repeated in a short time), the mechanical gear position of the mechanical stepwise variable transmission will not be shifted in accordance with the repeated shifts of the virtual gear position. Namely, engagement and release of the frictional engagement elements of the mechanical stepwise variable transmission will not be repeated in a short time, and the amount of heat generated in the frictional engagement elements can be prevented from being increased. Consequently, the durability of the frictional engagement elements can be kept high.

In the hybrid vehicle as described above, a fourth given virtual gear position may be set to a virtual gear position having a speed ratio that is smaller by one speed than that of a third given virtual gear position. The third given virtual gear position may be a virtual gear position having the largest speed ratio, in a group of the virtual gear positions assigned to a given mechanical gear position when the mechanical gear position is downshifted. The fourth given virtual gear position may be a virtual gear position having the largest speed ratio, in a group of the virtual gear positions assigned to the given mechanical gear position when the mechanical gear position is upshifted. The group of virtual gear positions may include at least one virtual gear position assigned to the given mechanical gear position.

With the above arrangement, when the mechanical gear position is upshifted, the group of virtual gear positions assigned to the mechanical gear position can be expanded to the side on which the speed ratio is smaller. Therefore, when the virtual gear position is upshifted during acceleration of the vehicle, for example, the mechanical gear position having a large speed ratio is maintained (the vehicle is accelerated while keeping a large speed ratio of the power transmission system as a whole), so that the acceleration performance of the vehicle can be enhanced while the above-described effect is yielded (the amount of heat generated in the frictional engagement elements can be prevented from being increased).

In the hybrid vehicle as described above, the electronic control unit may be configured to switch the power transmission system between an automatic shift mode and a manual shift mode. The automatic shift mode may be a mode in which the virtual gear position is automatically changed according to traveling conditions of the hybrid vehicle, and the manual shift mode may be a mode in which the virtual gear position is changed according to a gear position selecting operation of a driver. The first given virtual gear position in the automatic shift mode may be different from the first given virtual gear position in the manual shift mode.

In the hybrid vehicle as described above, the electronic control unit may be configured to switch the power transmission system between an automatic shift mode and a manual shift mode. The automatic shift mode may be a mode in which the virtual gear position is automatically changed according to traveling conditions of the hybrid vehicle. The manual shift mode may be a mode in which the virtual gear position is changed according to a gear position selecting operation of a driver. The second given virtual gear position in the automatic shift mode is different from the second given virtual gear position in the manual shift mode.

Generally, in the automatic shift mode, a demand for improvement of the fuel consumption rate is high. In the manual shift mode, on the other hand, high traveling performance of the vehicle is requested. In the automatic shift mode, shifts are performed according to the driver's operation of the accelerator pedal, etc. In this case, however, upshift and downshift of the virtual gear position are unlikely to be repeated in a short time. Therefore, in the automatic shift mode, the virtual gear positions assigned to each mechanical gear position when the mechanical gear position is upshifted are made identical with the virtual gear positions assigned to each mechanical gear position when the mechanical gear position is downshifted. Then, shift conditions for each gear position are set so that high fuel economy performance can be obtained on both upshifts and downshifts. On the other hand, in the manual shift mode, the operation to select the gear position may be frequently performed by the driver. In this case, upshift and downshift of the virtual gear position may be repeated in a short time. Therefore, in the manual shift mode, the virtual gear positions assigned to each mechanical gear position when the mechanical gear position is upshifted are made different from the virtual gear positions assigned to each mechanical gear position when the mechanical gear position is downshifted (are made different from the virtual gear positions assigned to each mechanical gear position in the automatic shift mode), so that the amount of heat generated in the friction engagement elements of the mechanical stepwise variable transmission is prevented from being increased, and the durability of the frictional engagement elements can be kept high, as described above.

In the hybrid vehicle as described above, the electronic control unit may be configured to control the mechanical stepwise variable transmission such that the mechanical gear position is upshifted when the electric continuously variable transmission is shifted up from a predetermined virtual gear position. The electronic control unit may be configured to control the electric continuously variable transmission such that only the virtual gear position is downshifted when the electric continuously variable transmission is shifted down to the predetermined virtual gear position.

In the hybrid vehicle as described above, the electronic control unit may be configured to switch the power transmission system between an automatic shift mode and a manual shift mode. The automatic shift mode may be a mode in which the virtual gear position is automatically changed according to traveling conditions of the hybrid vehicle. The manual shift mode may be a mode in which the virtual gear position is changed according to a gear position selecting operation of a driver. When the electronic control unit controls the mechanical stepwise variable transmission such that the mechanical gear position is upshifted when the electric continuously variable transmission is shifted up from the predetermined virtual gear position in the automatic shift mode, the electronic control unit may be configured not to execute a control in which the mechanical stepwise variable transmission is controlled such that the mechanical gear position is upshifted even when the electric continuously variable transmission is shifted up from the predetermined virtual gear position in the manual shift mode.

In the hybrid vehicle as described above, the electronic control unit may be configured to switch the power transmission system between an automatic shift mode and a manual shift mode. The automatic shift mode may be a mode in which the virtual gear position is automatically changed according to traveling conditions of the hybrid vehicle. The manual shift mode may be a mode in which the virtual gear position is changed according to a gear position selecting operation of a driver. When the electronic control unit controls the mechanical stepwise variable transmission such that the mechanical gear position is downshifted when the electric continuously variable transmission is shifted down to the predetermined virtual gear positions in the automatic mode, the electronic control unit may be configured not to execute a control in which the mechanical stepwise variable transmission is controlled such that the mechanical gear position is downshifted even when the electric continuously variable transmission is shifted down to the predetermined virtual gear position in the manual shift mode.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 7 is a gear position assignment table showing the relationship between the mechanical gear positions and the virtual gear positions assigned to each mechanical gear position, at the time of upshift and downshift, respectively, in the first embodiment;

FIG. 12 is a gear position assignment table showing the relationship between the mechanical gear positions and the virtual gear positions assigned to each mechanical gear position, at the time of upshift and downshift, respectively, in an automatic shift mode according to a second embodiment;

FIG. 13 is a gear position assignment table showing the relationship between the mechanical gear positions and the virtual gear positions assigned to each mechanical gear position, at the time of upshift and downshift, respectively, in a manual shift mode according to the second embodiment;

FIG. 14 is a gear position assignment table showing the relationship between the mechanical gear positions and the virtual gear positions assigned to each mechanical gear position, at the time of upshift and downshift, respectively, in the automatic shift mode according to a third embodiment; and FIG. 15 is a gear position assignment table showing the relationship between the mechanical gear positions and the virtual gear positions assigned to each mechanical gear position, at the time of upshift and downshift, respectively, in the manual shift mode according to the third embodiment.

DETAILED DESCRIPTION OF EMBODIMENTS

Some embodiments of the disclosure will be described with reference to the drawings. In the embodiments, the disclosure is applied to a hybrid vehicle of an FR (front-engine, rear-drive) type.

Figure 1:
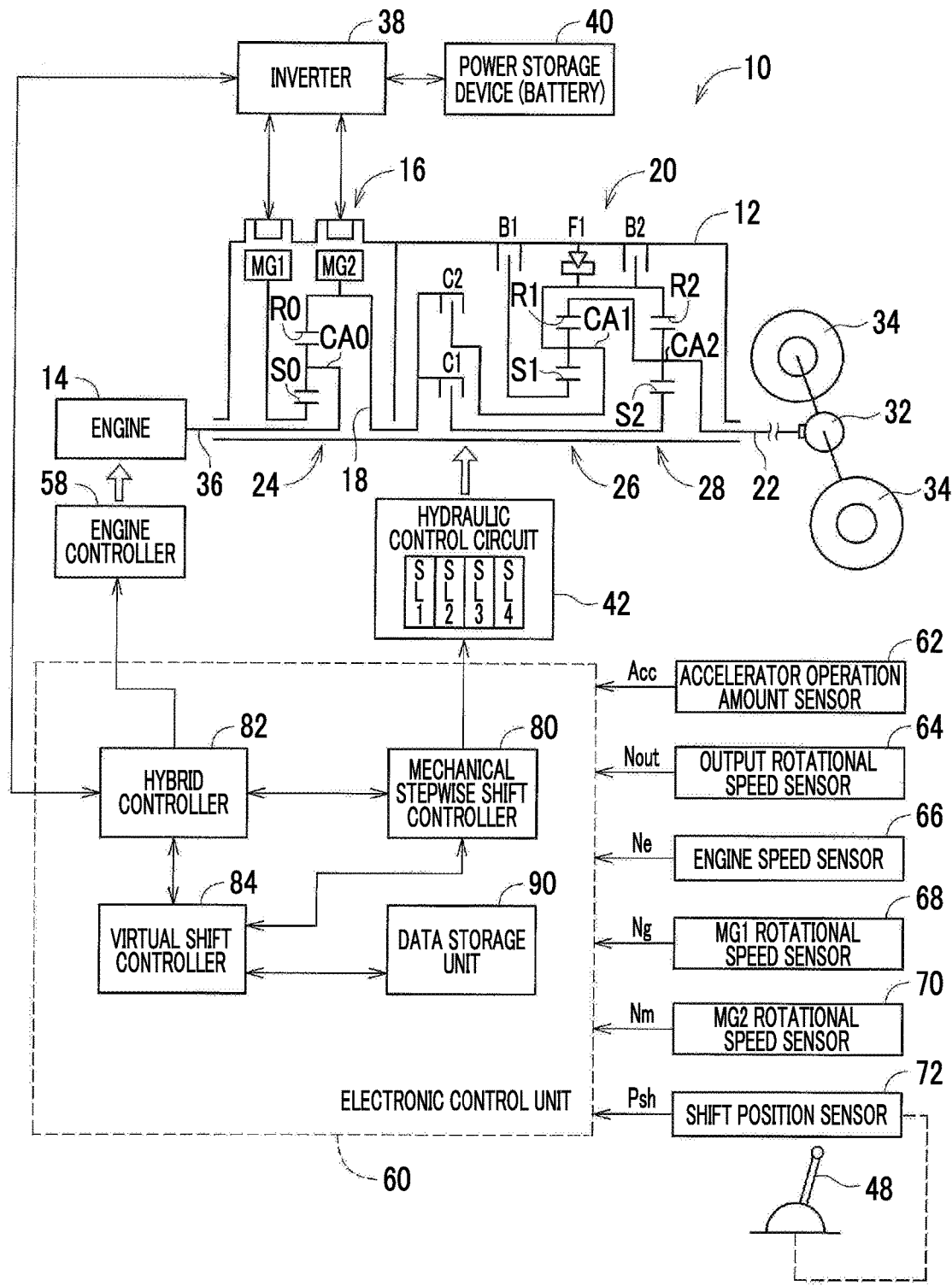
FIG. 1 is a skeleton diagram of a vehicular drive system according to one embodiment, along with a principal part of a control system.

FIG. 1 is a skeleton diagram of a vehicular drive system (power transmission system) 10 according to a first embodiment, and also shows a principal part of a control system associated with shift control. As shown in FIG. 1, the vehicular drive system 10 includes an engine 14, an electric continuously variable transmission 16, a mechanical stepwise variable transmission 20, and an output shaft 22, which are connected in series and disposed on a common axis within a transmission case 12 (which will be called "case 12") as a non-rotating member mounted on the vehicle body. The electric continuously variable transmission 16 is connected to the engine 14 directly or indirectly via a damper (not shown), or the like. The mechanical stepwise variable transmission 20 is connected to the output side of the electric continuously variable transmission 16. The output shaft 22 is connected to the output side of the mechanical stepwise variable transmission 20. In operation, the drive force is transmitted from the output shaft 22 to a pair of drive wheels 34, 34, via a differential gear unit (final reduction gear) 32, a pair of axles, etc. The engine 14 is a drive source for running the vehicle, and is an internal combustion engine, such as a gasoline engine or a diesel engine. In this embodiment, the engine 14 is connected to the electric continuously variable transmission 16 with no hydraulic transmission device, such as a torque converter or a fluid coupling, interposed therebetween.

The electric continuously variable transmission 16 includes a first motor-generator MG1 for differential operation, a differential mechanism 24, and a second motor-generator MG2 for running or driving the vehicle. The differential mechanism 24 is configured to mechanically distribute the output or power of the engine 14 to the first motor-generator MG1 and the intermediate transmission member 18. The second motor-generator MG2 is operatively connected to the intermediate transmission member 18 so as to rotate as a unit with the transmission member 18. Each of the first motor-generator MG1 and the second motor-generator MG2 can be selectively used as an electric motor or a generator. The first motor-generator MG1 corresponds to a rotating machine for differential operation (which will be called "differential rotating machine"), and the second motor-generator MG2 corresponds to a rotating machine for running or driving the vehicle (which will be called "driving rotating machine").

The differential mechanism 24 is in the form of a single pinion type planetary gear unit, and includes a sun gear S0, a carrier CA0, and a ring gear R0. The carrier CA0 is a first rotating element connected to the engine 14 via a connecting shaft 36.

The sun gear S0 is a second rotating element connected to the first motor-generator MG1. The ring gear R0 is a third rotating element connected to the intermediate transmission member 18. In other words, in a nomographic chart of the electric continuously variable transmission 16 shown on the left side in FIG. 8, the engine (E/G) 14 is connected to the carrier CA0 that is located at the middle in the chart and provides the middle rotational speed, and the first motor-generator MG1 for differential operation, and the second motor-generator MG2 for running/driving the vehicle are respectively connected to the sun gear S0 and the ring gear R0 which are located at the opposite ends. The sun gear S0, carrier CA0, and the ring gear R0 can rotate relative to each other. The output of the engine 14 is divided and distributed to the first motor-generator MG1 and the intermediate transmission member 18, and the second motor-generator MG2 is rotated or driven (via an electric path) with electric energy obtained through regeneration control (or power generation control) performed on the first motor-generator MG1, or a power storage device (battery) 40 is charged with the electric energy via an inverter 38. Thus, the differential status of the differential mechanism 24 can be changed as needed, by controlling the rotational speed (MG1 rotational speed) Ng of the first motor-generator MG1, or the rotational speed of the sun gear S0, through regeneration control or power running control of the first motor-generator MG1. Accordingly, the differential mechanism 24 can steplessly (continuously) change the speed ratio $\gamma 1$ (=Ne/Nm) of the rotational speed of the connecting shaft 36 or the engine speed Ne, to the rotational speed (intermediate transmission member rotational speed) Nm of the intermediate transmission member 18. Since the intermediate transmission member rotational speed Nm is equal to the rotational speed (MG2 rotational speed) of the second motor-generator MG2, these speeds will be denoted by the same symbol Nm. Thus, the electric continuously variable transmission 16 is configured to be able to steplessly change the rotational speed of the engine (drive source) 14 through torque control of the first motor-generator (differential rotating machine) MG1, and transmit the resulting rotation to the intermediate transmission member 18.

The mechanical stepwise variable transmission 20 provides a part of a power transmission path between the engine 14 and the drive wheels 34, and is a planetary gear type, multiple-speed transmission having a single pinion type first planetary gear unit 26 and a single pinion type second planetary gear unit 28. The first planetary gear unit 26 includes a sun gear S1, a carrier CA1, and a ring gear R1. The second planetary gear unit 28 includes a sun gear S2, a carrier CA2, and a ring gear R2. The sun gear S1 is selectively connected to the case 12 via a first brake B1. The sun gear S2 is selectively connected to the intermediate transmission member 18 via a first clutch C1. The carrier CA1 and the ring gear R2, which are connected integrally with each other, are selectively connected to the intermediate transmission member 18 via a second clutch C2, and are also selectively connected to the case 12 via a second brake B2. Also, the carrier CA1 and the ring gear R2 are connected to the case 12 via a one-way clutch F1, so as to be allowed to rotate in the same direction as the engine 14 but inhibited from rotating in the reverse direction. The ring gear R1 and the carrier CA2 are connected integrally with each other, and are connected integrally to the output shaft 22.

With the clutches C1, C2 and the brakes B1, B2 (which will be simply referred to as "clutches C" and "brakes B" when they are not particularly distinguished) selectively engaged, the mechanical stepwise variable transmission 20 is placed in a selected one of a plurality of forward gear positions having different speed ratios $\gamma 2$ (=Nm/Nout) of the intermediate transmission member rotational speed Nm to the rotational speed (output rotational speed) Nout of the output shaft 22. The forward gear positions correspond to mechanical gear positions that are mechanically established. As shown in the engagement operation table of FIG. 2, the mechanical 1st-speed gear position having the largest speed ratio $\gamma 2$ is established when the first clutch C1 and the second brake B2 are engaged. The mechanical 2nd-speed gear position having a smaller speed ratio $\gamma 2$ than that of the mechanical 1st-speed gear position is established when the first clutch C1 and the first brake B1 are engaged. The mechanical 3rd-speed gear position of which the speed ratio $\gamma 2$ is equal to 1 is established when the first clutch C1 and the second clutch C2 are engaged. The 4th-speed gear position of which the speed ratio $\gamma 2$ is smaller than 1 is established when the second clutch C2 and the first brake B1 are engaged. Since the one-way clutch F1 is provided in parallel with the second brake B2, the second brake B2 may be engaged in the mechanical 1st-speed gear position when an engine brake is applied in a driven mode, and may be held in a released state in a driving mode, such as when the vehicle is started. Thus, the mechanical stepwise variable transmission 20 is disposed between the intermediate transmission member 18 and the drive wheels 34, and is configured to be able to mechanically establish a plurality of mechanical gear positions having different ratios of the rotational speed of the intermediate transmission member 18 to the output rotational speed, by selectively placing frictional engagement elements in engaged and released states.

Figures 2, 3:
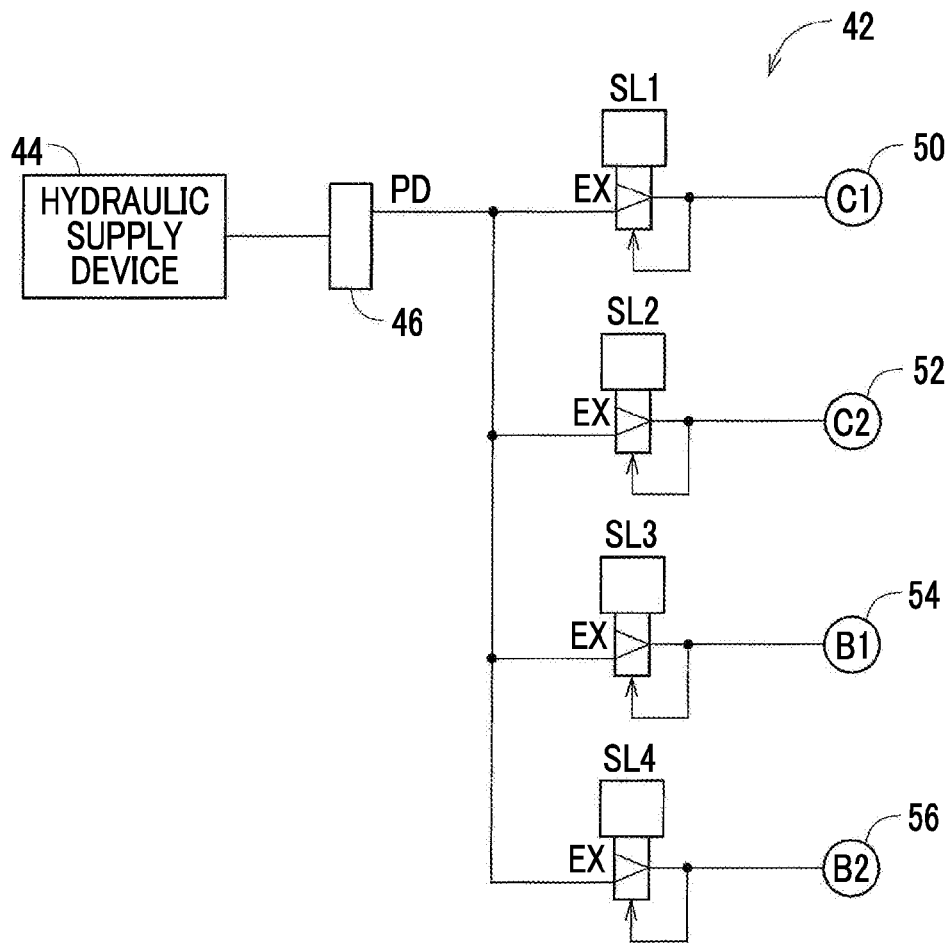
FIG. 2 is an engagement operation table showing the relationship between a plurality of mechanical gear positions of a mechanical stepwise variable transmission, and hydraulic frictional engagement elements that establish the gear positions.
FIG. 3 is a circuit diagram showing a hydraulic control circuit associated with clutches C1, C2 and brakes B1, B2 of the mechanical stepwise variable transmission.

The clutches and the brakes B are multi-plate or single-plate type hydraulic frictional engagement elements that are frictionally engaged by hydraulic pressure. FIG. 3 is a circuit diagram showing a principal part of a hydraulic control circuit 42 including linear solenoid valves SL1-SL4 that control engagement and release of the clutches C and the brakes B. In the hydraulic control circuit 42, a D range pressure (forward range pressure) PD is supplied from a hydraulic supply device 44 via a manual valve 46. The hydraulic supply device 44 includes a mechanical oil pump, an electric oil pump, or the like, as a hydraulic pressure source, and delivers a given hydraulic pressure (line pressure) regulated by a line-pressure control valve, or the like. The mechanical oil pump is a pump rotated or driven by the engine 14. The electric oil pump is a pump driven by an electric motor when the engine is not in operation. The manual valve 46 is operable to mechanically or electrically switch oil passages according to operation of a shift lever 48 (see FIG. 1). The manual valve 46 delivers the D range pressure PD when the shift lever 48 is operated to select a D range for forward traveling. The shift lever 48 is operable to select the D range for forward traveling, R range for reverse traveling, or N range for cutting off power transmission, for example.

The linear solenoid valves SL1-SL4 as hydraulic control devices are provided for respective hydraulic actuators (hydraulic cylinders) 50, 52, 54, 56 of the clutches C1, C2 and the brakes B1, B2 for shifting the mechanical stepwise variable transmission 20. The linear solenoid valves SL1-SL4 are independently energized and de-energized by an electronic control unit 60. With the hydraulic pressures of the respective hydraulic actuators 50, 52, 54, 56 thus independently regulated and controlled, engagement and release of the clutches C1, C2 and the brakes B1, B2 are individually controlled, so that the mechanical 1st-speed gear position through the mechanical 4th-speed gear position are established. Also, in shift control of the mechanical stepwise variable transmission 20, a clutch-to-clutch shift is performed on which release and engagement of selected ones of the clutches C and brakes B which are associated with the shift are controlled at the same time. For example, on a 3→2 downshift from the mechanical 3rd-speed gear position to the mechanical 2nd-speed gear position, the second clutch C2 is released, and the first brake B1 is engaged at the same time, as indicated in the engagement operation table of FIG. 2. In order to suppress or reduce shift shock, the transient hydraulic pressure for releasing the second clutch C2 and the transient hydraulic pressure for engaging the first brake B1 are regulated or controlled according to predetermined change patterns, for example. Thus, the hydraulic pressures, or engagement torques, of the frictional engagement elements (clutches C, brakes B) of the mechanical stepwise variable transmission 20 can be independently and continuously controlled by the linear solenoid valves SL1-SL4, respectively.

The shift lever 48 according to this embodiment can be operated (manually by the driver) to a parking (P) position, reverse (R) position, neutral (N) position, drive (D) position, and a sequential (S) position. The position to which the shift lever 48 is operated is detected by a shift position sensor 72 (see FIG. 1).

In a condition where the shift lever 48 is placed in the drive (D) position, the vehicular drive system 10 is in an automatic shift mode, in which the electric continuously variable transmission 16 and the mechanical stepwise variable transmission 20 are basically controlled such that an operating point of the engine 14 lies on or in the vicinity of the optimum fuel economy line.

In a condition where the shift lever 48 is placed in the sequential (S) position, the vehicular drive system 10 is in a manual shift mode (sequential shift mode). At the front and the back of the sequential (S) position, "+" position and "−" position are provided. The shift lever 48 is operated to the "+" position when a manual upshift is performed, and the shift lever 48 is operated to the "−" position when a manual downshift is performed. When the shift lever 48 is operated (manually as a gear position selecting operation by the driver) to the "+" position or "−" position while it is placed in the sequential (S) position, the electric continuously variable transmission 16 that establishes a plurality of virtual gear positions (i.e., gear positions established by adjusting the engine speed through control of the first motor-generator MG1; the virtual gear positions will be described later) is shifted up or down.

The vehicular drive system 10 includes the electronic control unit 60 as a controller that performs output control of the engine 14, and shift control of the electric continuously variable transmission 16 and the mechanical stepwise variable transmission 20. The electronic control unit 60 includes a microcomputer having CPU, R0M, RAM, input/output interface, and so forth. The electronic control unit 60 performs signal processing according to programs stored in advance in the R0M, while utilizing the temporary storage function of the RAM. The electronic control unit 60 consists of two or more electronic control units for use in engine control, shift control, etc. as needed. The electronic control unit 60 receives various kinds of information needed for control, such as the amount of operation of the accelerator pedal (accelerator operation amount) Acc, output rotational speed Nout, engine speed Ne, MG1 rotational speed Ng, MG2 rotational speed Nm, the operated position information Psh of the shift lever 48, etc. from an accelerator operation amount sensor 62, output rotational speed sensor 64, engine speed sensor 66, MG1 rotational speed sensor 68, MG2 rotational speed sensor 70, shift position sensor 72, etc. The output rotational speed Nout corresponds to the vehicle speed V.

The electronic control unit 60 functionally includes a mechanical stepwise shift controller 80, hybrid controller 82, and a virtual shift controller 84.

In the automatic shift mode, the mechanical stepwise shift controller 80 makes a shift determination for the mechanical stepwise variable transmission 20, according a predetermined shift map (which will be described later), using the output rotational speed Nout and the accelerator operation amount Acc as parameters, and changes engaged/released states of the clutches C and the brakes B by means of the linear solenoid valves SL1-SL4 as needed, so as to automatically change the mechanical gear position of the mechanical stepwise variable transmission 20. The shift map is determined such that the MG2 rotational speed Nm as the rotational speed of the intermediate transmission member 18 and the second motor-generator MG2 is held within a given rotational speed range. Thus, the mechanical stepwise shift controller 80 switches engaged and released states of the frictional engagement elements so as to establish one mechanical gear position, out of a plurality of the mechanical gear positions, according to predetermined mechanical gear position shift conditions (shift conditions specified by the output rotational speed Nout and the accelerator operation amount Acc).

The hybrid controller 82 operates the engine 14 in an operating range having a high fuel efficiency, for example, and performs shift control for changing the speed ratio γ1 of the electric continuously variable transmission 16, by controlling the proportion of driving force between the engine 14 and the second motor-generator MG2 and reaction force produced through power generation of the first motor-generator MG1. For example, when the vehicle is travelling at the vehicle speed V, the hybrid controller 82 calculates a target (required) output of the vehicle from the accelerator operation amount Acc as the driver-requested output amount and the vehicle speed V, and calculates a necessary total target output from the target output of the vehicle and a charge required value. Then, the hybrid controller 82 obtains necessary input torque Tin of the mechanical stepwise variable transmission 20, according to the speed ratio γ2 of the mechanical gear position of the mechanical stepwise variable transmission 20, etc., so that the total target output is obtained. Further, the hybrid controller 82 calculates a target engine output (required engine output) with which the necessary input torque Tin is obtained, in view of assist torque of the second motor-generator MG2, etc. Then, the hybrid controller 82 controls the engine 14 and controls the amount of power generation of the first motor-generator MG1 in a feedback manner, so as to provide the engine speed Ne and engine torque Te with which the target engine output is obtained. The hybrid controller 82 performs the output control of the engine 14, via an engine controller 58 including an electronic throttle valve that controls the intake air amount, fuel injection device that controls the fuel injection amount, ignition device of which the ignition timing can be controlled to be advanced or retarded, and so forth. Also, the hybrid controller 82 performs power running control and regeneration control of the first motor-generator MG1 and the second motor-generator MG2, while performing charge/discharge control of the power storage device 40 via the inverter 38.

Figure 4:
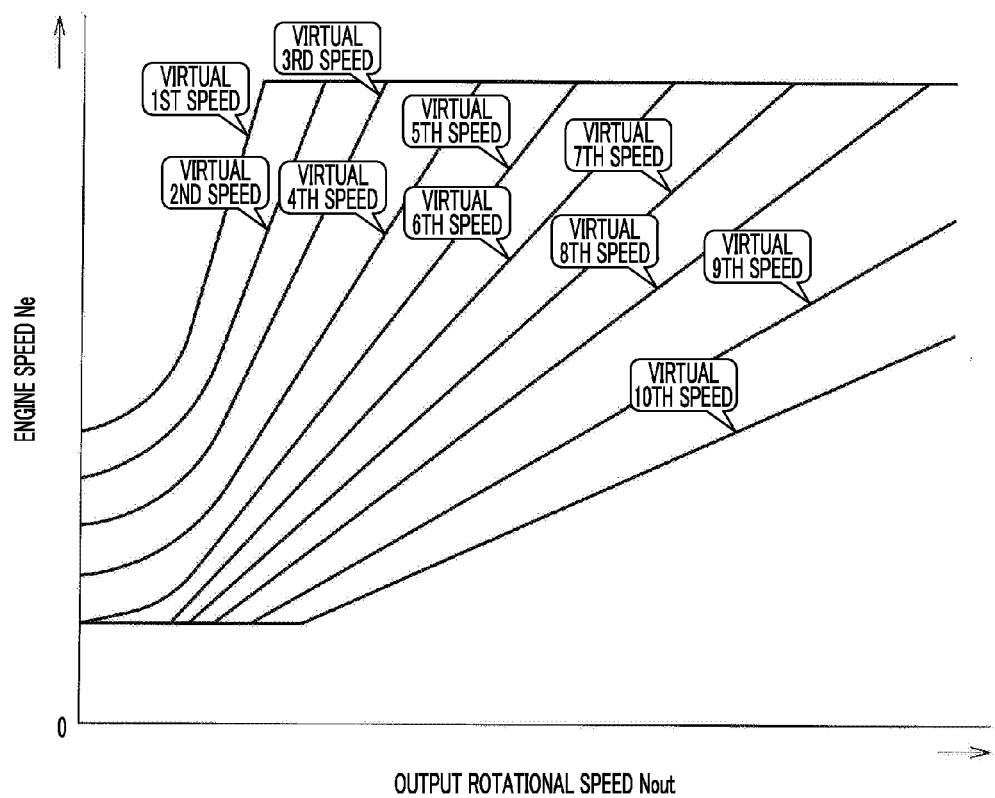
FIG. 4 is a view useful for explaining one example of a plurality of virtual gear positions established when the electric continuously variable transmission is shifted stepwise.

The virtual shift controller 84 controls the electric continuously variable transmission 16 so as to establish a plurality of virtual gear positions having different speed ratios γ0 (=Ne/Nout) of the engine speed Ne to the output rotational speed Nout of the mechanical stepwise variable transmission 20 (i.e., so as to vary the speed ratio γ0 by varying the speed ratio γ1 as the ratio of the rotational speed of the engine 14 to the rotational speed of the intermediate transmission member 18). In the automatic shift mode, the virtual shift controller 84 performs shift control according to a predetermined shift map, so as to establish the virtual gear positions. The speed ratio γ0 is a value (γ0=γ1×γ2) obtained by multiplying the speed ratio γ1 of the electric continuously variable transmission 16 by the speed ratio γ2 of the mechanical stepwise variable transmission 20. As shown in FIG. 4 by way of example, the virtual gear positions can be established by controlling the engine speed Ne by means of the first motor-generator MG1, according to the output rotational speed Nout, so that the speed ratio γ0 of each gear position can be maintained. The speed ratio γ0 of each virtual gear position need not be a constant value (a straight line that passes the origin 0 in FIG. 4), but may be changed in a given range, or may be limited by the upper limit and/or lower limit of the rotational speed of each part, for example. FIG. 4 shows the case where 10-speed shifts involving virtual 1st-speed gear position through virtual 10th-speed gear position as the plurality of virtual gear positions can be performed. As is apparent from FIG. 4, a selected one of the virtual gear positions can be established merely by controlling the engine speed Ne according to the output rotational speed Nout, irrespective of the type of the mechanical gear position of the mechanical stepwise variable transmission 20. Thus, the virtual shift controller 84 is adapted to establish one virtual gear position, out of a plurality of virtual gear positions having different ratios of the rotational speed of the engine (drive source) 14 to the rotational speed of the intermediate transmission member 18, according to predetermined virtual gear position shift conditions (shift conditions specified by the output rotational speed Nout, accelerator operation amount Acc, etc.).

Like the shift map used for switching the mechanical gear position, the shift map used for switching the virtual gear position is determined in advance, using the output rotational speed Nout and the accelerator operation amount Acc as parameters.

Thus, the vehicular drive system 10 according to this embodiment is configured such that the mechanical stepwise variable transmission 20 is connected in series to the output side of the electric continuously variable transmission 16. Therefore, it is possible to change the virtual gear position while keeping the engine speed Ne substantially constant, by switching the mechanical gear position of the mechanical stepwise variable transmission 20. Namely, the amount of electric energy through the electric path can be reduced by making the rotational speed of the first motor-generator MG1 close to zero, so that an energy loss can be reduced.

Figure 5:
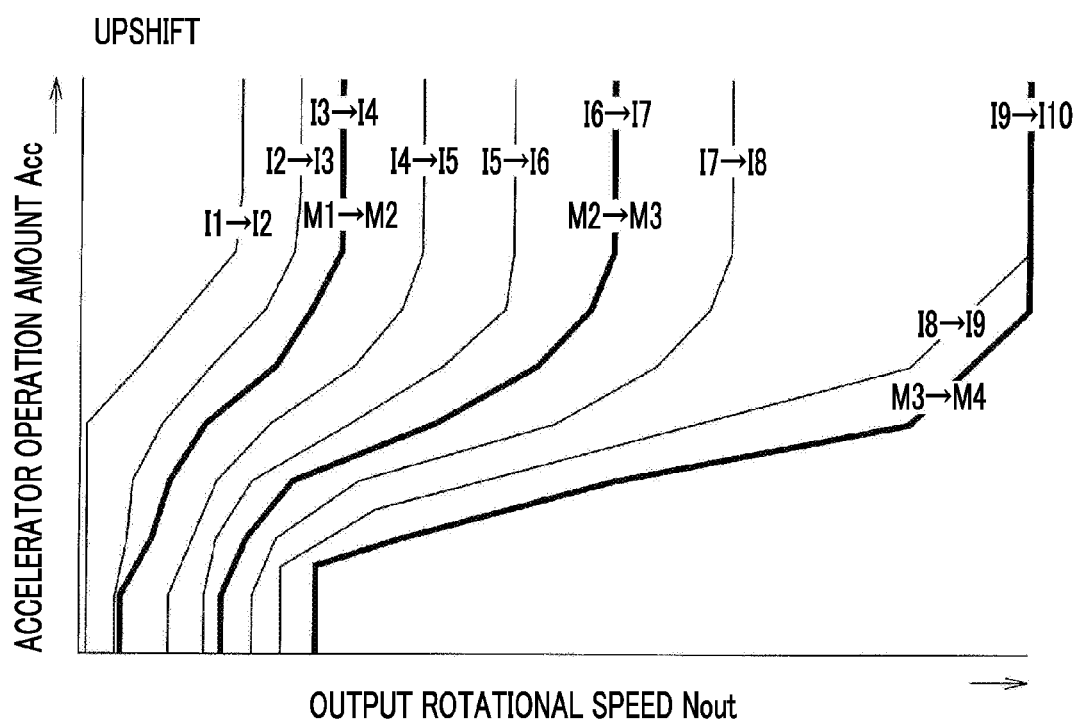
FIG. 5 is a shift map showing shift lines of virtual gear positions and mechanical gear shifts on upshifts in the first embodiment.

FIG. 5 shows one example of shift map of virtual gear positions and mechanical gear positions, for use when the vehicle drive system 10 is upshifted in the automatic shift mode. In FIG. 5, each line is an upshift line, and the engine speed Ne is determined so as to be held in a given rotational speed range. The shift map corresponds to shift conditions of virtual gear positions and mechanical gear positions. In FIG. 5, I1 to I10 indicate the speeds of the virtual gear positions. Also, M1 to M4 in FIG. 5 indicate the speeds of the mechanical gear positions. According to the shift map, only the virtual gear position, or both of the virtual gear position and the mechanical gear position, is/are switched (upshifted), so that the vehicular drive system 10 as a whole provides substantially the same shift feeling as that provided by a stepwise variable transmission. The virtual stepwise shifts may be performed in priority to stepless shift control executed by the hybrid controller 82, only when the driver selects a traveling mode, such as a sporty traveling mode, which places emphasis on the traveling performance, for example. However, in this embodiment, the virtual stepwise shifts are basically performed except when a certain restriction is placed on their implementation. The shift map of FIG. 5 and the engine speed map of each virtual gear position in FIG. 4 are stored in advance in a data storage unit 90 of the electronic control unit 60.

Here, the virtual stepwise shift control performed by the virtual shift controller 84 and the mechanical stepwise shift control performed by the mechanical stepwise shift controller 80 are performed in coordination. Namely, the number of speeds of the virtual gear positions is 10 (I1-I10), which is larger than the number of speeds 4 (M1-M4) of the mechanical gear positions, and one virtual gear position or two or more virtual gear positions is/are assigned to each mechanical gear position M1-M4, so that the virtual gear position(s) is/are established when the mechanical gear position is established. Also, conditions under which each mechanical gear position is shifted are matched with conditions under which one of the corresponding virtual gear positions is shifted. The upper section of FIG. 7 (gear position assignment table) shows a gear position assignment table indicating the relationship between the mechanical gear positions and the virtual gear position(s) assigned to each mechanical gear position at the time of upshifts, in correspondence with the shift map (FIG. 5). According to the gear position assignment table of FIG. 7, on upshifts of the vehicular drive system 10, the virtual 1st-speed gear position to virtual 3rd-speed gear position are established with respect to the mechanical 1st-speed gear position, and the virtual 4th-speed gear position to virtual 6th-speed gear position are established with respect to the mechanical 2nd-speed gear position. Also, the virtual 7th-speed gear position to virtual 9th-speed gear position are established with respect to the mechanical 3rd-speed gear position, and the virtual 10th-speed gear position is established with respect to the mechanical 4th-speed gear position. The gear position assignment table is stored in advance in the data storage unit 90.

In this embodiment, on upshifts in the manual shift mode, the virtual gear position and the mechanical gear position are shifted according to the gear position assignment table.

Figure 8:
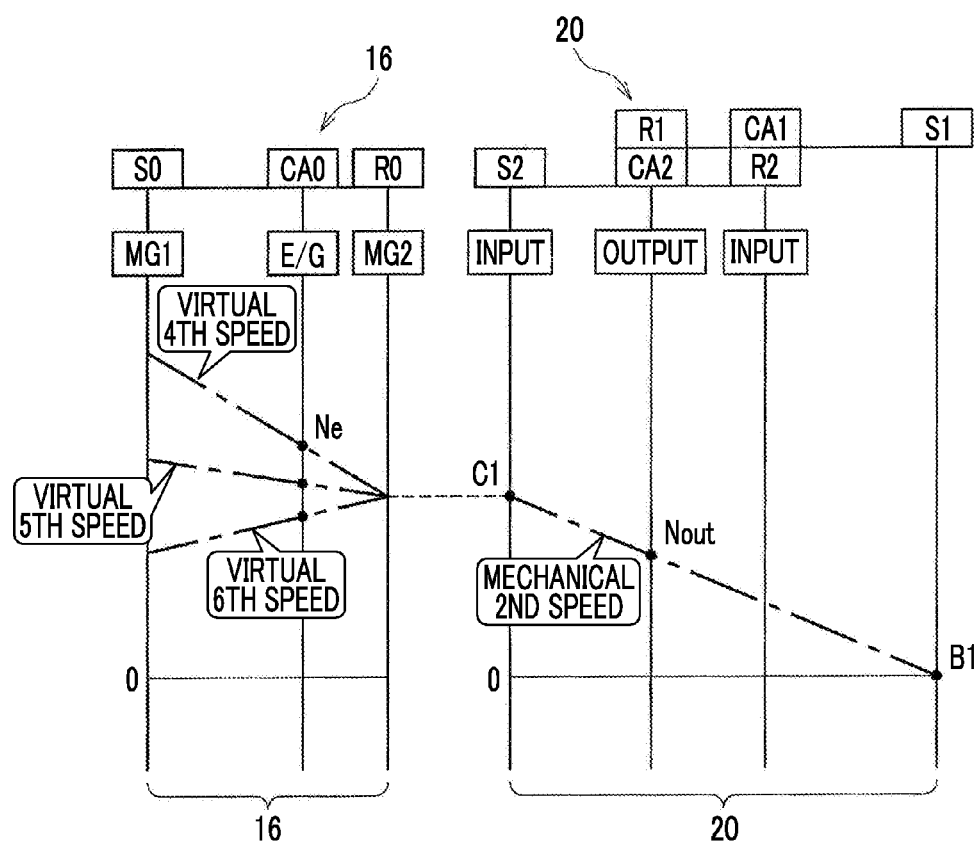
FIG. 8 is a view illustrating the virtual 4th-speed gear position to 6th-speed gear position established when the mechanical gear position is the 2nd-speed position, on a nomographic chart.

FIG. 8 is one example of nomographic chart in which the rotational speeds of respective parts of the electric continuously variable transmission 16 and the mechanical stepwise variable transmission 20 can be connected by straight lines. FIG. 8 illustrates the case where the virtual 4th-speed gear position to virtual 6th-speed gear position are established when the mechanical stepwise variable transmission 20 is placed in the mechanical 2nd-speed gear position, and each virtual gear position is established by controlling the engine speed Ne so as to achieve a given speed ratio γ0 with respect to the output rotational speed Nout.

In the manner as described above, the plurality of virtual gear positions are assigned to the plurality of mechanical gear positions. Thus, in this embodiment, when upshift is carried out, in either of the automatic shift mode and the manual shift mode, M1→M2 shift of the mechanical gear position is performed at the time of I3→I4 shift of the virtual gear position, and M2→M3 shift of the mechanical gear position is performed at the time of I6→I7 shift of the virtual gear position, while M3→M4 shift of the mechanical gear position is performed at the time of I9→I10 shift of the virtual gear position. In these cases, the shift of the virtual gear position is performed in the same timing as the shift timing of the mechanical gear position. More specifically, each of the upshift lines of "I3→I4", "I6→I7" and "I9→I11" in the shift map of FIG. 5 coincides with a corresponding one of the upshift lines (indicated by thick solid lines in FIG. 5) of "M1→M2", "M2→M3" and "M3→M4" of the mechanical gear position shift map. A shift command to establish a certain mechanical gear position may be generated to the mechanical stepwise shift controller 80, based on a shift determination on the virtual gear position according to the shift map of FIG. 5. Thus, since the virtual gear position is shifted in the same timing as the shift timing of the mechanical gear position, the mechanical stepwise variable transmission 20 is shifted along with a change of the engine speed Ne, and the driver is less likely or unlikely to feel strange or uncomfortable even if shift shock occurs during shifting of the mechanical stepwise variable transmission 20. Namely, shift shock caused by a shift of the mechanical gear position is blended into shift shock caused by the corresponding shift of the virtual gear position, and the driver is less likely or unlikely to feel strange since shift shock does not occur solely due to a shift of the mechanical stepwise variable transmission 20.

Figure 6:
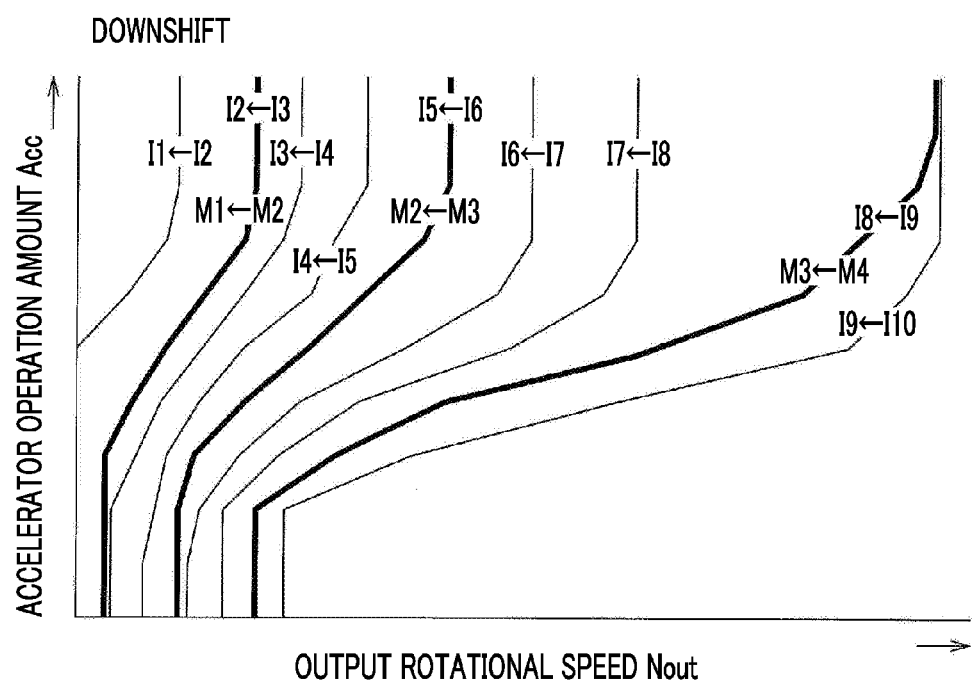
FIG. 6 is a shift map showing shift lines of virtual gear positions and mechanical gear positions on downshifts in the first embodiment.

FIG. 6 shows one example of shift map of virtual gear positions and mechanical gear positions, for use when the vehicle drive system 10 is downshifted in the automatic shift mode. Each line of FIG. 6 is a downshift line, and the engine speed Ne is determined so as to be held in a given rotational speed range. The shift map also corresponds to shift conditions of virtual gear positions and mechanical gear positions. In FIG. 6, too, I1 to I10 indicate the speeds of the virtual gear positions, and M1 to M4 indicate the speeds of the mechanical gear positions. According to the shift map, only the virtual gear position, or both of the virtual gear position and the mechanical gear position, is/are shifted (downshifted), so that the vehicular drive system 10 as a whole provides substantially the same shift feeling as that provided by a stepwise variable transmission. The shift map of FIG. 6 is also stored in advance in the data storage unit 90.

The lower section of FIG. 7 (gear position assignment table) shows a gear position assignment table indicating the relationship between the mechanical gear positions and the virtual gear positions assigned to each mechanical gear position at the time of downshifts, in correspondence with the shift map (FIG. 6). According to the gear position assignment table of FIG. 7, when the vehicular drive system 10 is downshifted, the virtual 1st-speed gear position to virtual 2nd-speed gear position are established with respect to the mechanical 1st-speed gear position, and the virtual 3th-speed gear position to virtual 5th-speed gear position are established with respect to the mechanical 2nd-speed gear position. Also, the virtual 6th-speed gear position to virtual 8th-speed gear position are established with respect to the mechanical 3rd-speed gear position, and the virtual 9th-speed gear position to virtual 10th-speed gear position are established with respect to the mechanical 4th-speed gear position. The gear position assignment table is also stored in advance in the data storage unit 90.

In this embodiment, on downshifts in the manual shift mode, the virtual gear position and the mechanical gear position are shifted according to the above gear position assignment table.

In the manner as described above, the plurality of virtual gear positions are assigned to the plurality of mechanical gear positions. Thus, in this embodiment, when downshift is carried out, in either of the automatic shift mode and the manual shift mode, M4→M3 shift of the mechanical gear position is performed at the time of I9→I8 shift of the virtual gear position, and M3→M2 shift of the mechanical gear position is performed at the time of I6→I5 shift of the virtual gear position, while M2→M1 shift of the mechanical gear position is performed at the time of I3→I2 shift of the virtual gear position. In this case, the shifts between the virtual gear positions are performed in the same timing as the shift timing of the mechanical gear positions. More specifically, each of the downshift lines of "I9→I8", "I6→I5", (and) "I3→I2" in the shift map of FIG. 6 coincides with (is identical with) a corresponding one of the downshift lines (indicated by thick solid lines in FIG. 6) of "M4→M3", "M3→M2", (and) "M2→M1". A shift command to establish a certain mechanical gear position may be generated to the mechanical stepwise shift controller 80, based on a shift determination on the corresponding virtual gear position according to the shift map of FIG. 6. Thus, since the virtual gear position is shifted in the same timing as the shift timing of the mechanical gear position, the mechanical stepwise variable transmission 20 is shifted along with a change of the engine speed Ne, and the driver is less likely or unlikely to feel strange or uncomfortable even if shift shock occurs during shifting of the mechanical stepwise variable transmission 20. Namely, shift shock caused by a shift of the mechanical gear position is blended into shift shock caused by the corresponding shift of the virtual gear position, and the driver is less likely or unlikely to feel strange since shift shock does not occur solely due to a shift of the mechanical stepwise variable transmission 20.

As described above, in this embodiment, the virtual gear positions assigned to each mechanical gear position when the mechanical gear position is upshifted are different from the virtual gear position assigned to each mechanical gear position when the mechanical gear position is downshifted.

More specifically, as a group of virtual gear positions comprised of one virtual gear position or two or more virtual gear positions assigned to a given mechanical gear position (e.g., the mechanical 2nd-speed gear position), a first given virtual gear position is set to a virtual gear position having a speed ratio that is larger by one speed than that of a second given virtual gear position. For example, the first given virtual gear position is a virtual gear position (virtual 3rd-speed gear position) having the largest speed ratio, in a group of virtual gear positions (virtual 3rd-speed gear position to virtual 5th-speed gear position) assigned to the given mechanical gear position (mechanical 2nd-speed gear position) when the mechanical gear position is downshifted. The second given virtual gear position is a virtual gear position (virtual 4th-speed gear position) having the largest speed ratio, in a group of virtual gear positions (virtual 4th-speed gear position to virtual 6th-speed gear position) assigned to the given mechanical gear position (mechanical 2nd-speed gear position) when the mechanical gear position is upshifted. In other words, as a group of virtual gear positions comprised of one virtual gear position or two or more virtual gear positions assigned to a given mechanical gear position (e.g., the mechanical 2nd-speed gear position), the second given virtual gear position is set to a virtual gear position having a speed ratio that is smaller by one speed than that of the first given virtual gear position.

Therefore, even when the electric continuously variable transmission 16 is repeatedly shifted between two virtual gear positions (when upshift and downshift are alternately repeated in a short period of time), the mechanical gear position of the mechanical stepwise variable transmission 20 is not shifted in association with the shifts of the virtual gear position. For example, in a situation where upshift and downshift of the electric continuously variable transmission 16 are repeated between the virtual 3rd-speed gear position and the virtual 4th-speed gear position, if the electric continuously variable transmission 16 is shifted up to the virtual 4th-speed gear position, from a condition where the electric continuously variable transmission 16 is placed in the virtual 3rd-speed gear position and the mechanical stepwise variable transmission 20 is placed in the mechanical 1st-speed gear position, the mechanical stepwise variable transmission 20 is shifted up to the mechanical 2nd-speed gear position in association with the upshift of the electric continuously variable transmission 16. Thereafter, even if upshift and downshift of the electric continuously variable transmission 16 are repeated between the virtual 3rd-speed gear position and the virtual 4th-speed gear position, the mechanical stepwise variable transmission 20 is not shifted down to the mechanical 1st-speed gear position when the electric continuously variable transmission 16 is shifted from the virtual 4th-speed gear position down to the virtual 3rd-speed gear position, and the mechanical 2nd-speed gear position is maintained. Therefore, engagement and release of the frictional engagement elements (brakes B1, B2 in this case) of the mechanical stepwise variable transmission 20 are not repeated in a short period of time, and the amount of heat generated in the frictional engagement elements is prevented from being increased.

Figure 9:
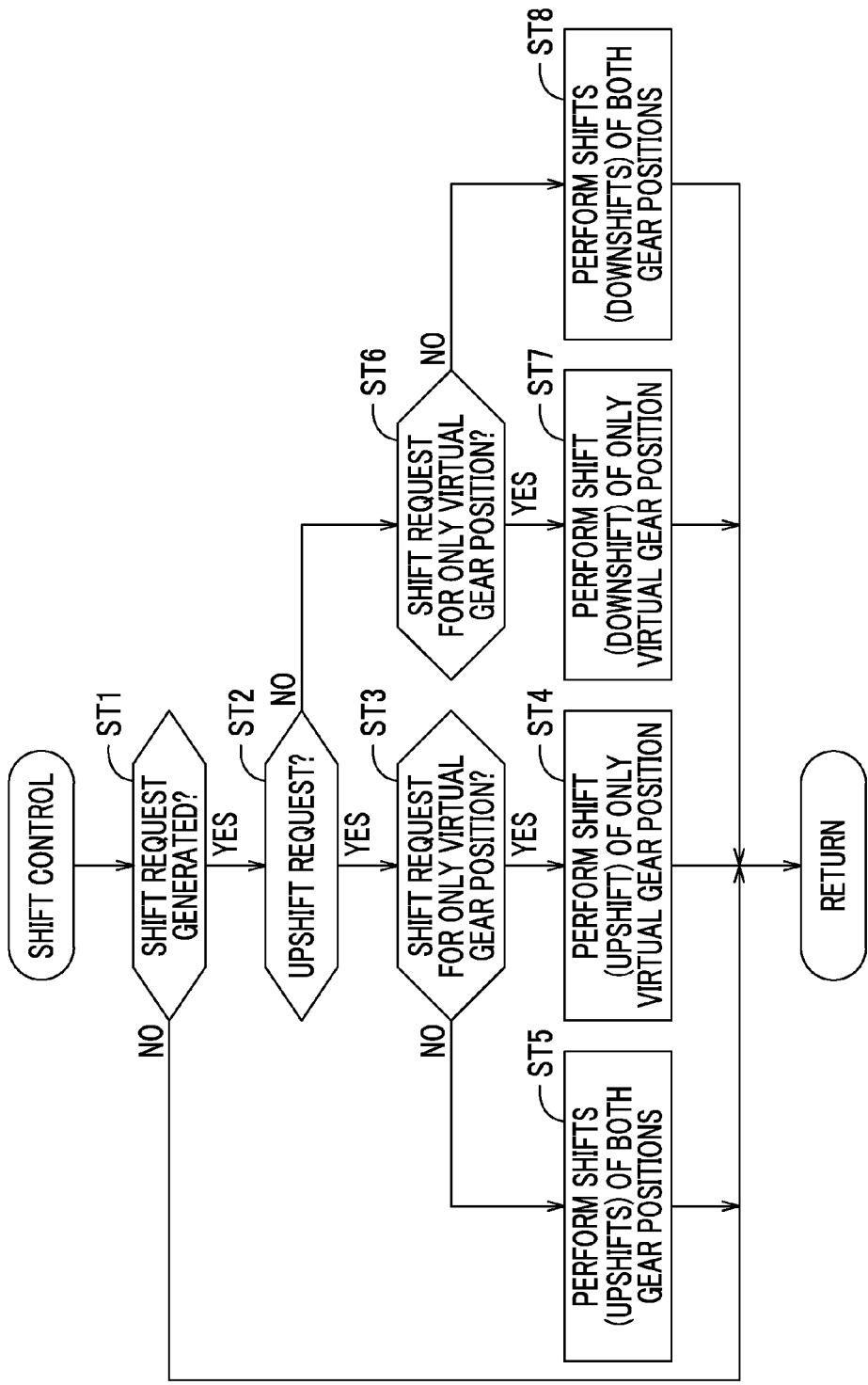
FIG. 9 is a flowchart showing the procedure of shift control.

Next, the procedure of shift control in this embodiment will be described according to the flowchart of FIG. 9. The control routine in the flowchart of FIG. 9 is repeatedly executed at given time intervals, after a start switch of the vehicle is operated to ON.

Initially, in step ST1, it is determined whether a shift request is generated. When the vehicular drive system 10 is in the automatic shift mode, it is determined in step ST1 whether an operating point of the drive system 10 is crossing a shift line (upshift or downshift line) due to change of the output shaft rotational speed Nout or the accelerator operation amount Acc, according to the shift maps as described above. When the drive system 10 is in the manual shift mode, it is determined whether the shift lever 48 is operated to the "+" position or the "−" position.

If no shift request is generated, and a negative decision (NO) is made in step ST1, the control returns since there is no need to shift both the electric continuously variable transmission 16 and the mechanical stepwise variable transmission 20.

On the other hand, if a shift request is generated, and an affirmative decision (YES) is made in step ST1, the control proceeds to step ST2, to determine whether the shift request is an upshift request. When the drive system 10 is in the automatic shift mode, it is determined in step ST2 whether the operating point has crossed an upshift line to the higher-gear side in the upshift shift map shown in FIG. 5, due to change of the output shaft rotational speed Nout or the accelerator operation amount Acc. When the drive system 10 is in the manual shift mode, it is determined whether the shift lever 48 has been operated to the "+" position.

If the shift request is an upshift request, and an affirmative decision (YES) is obtained in step ST2, the control proceeds to step ST3, to determine whether the shift request generated in this cycle is to request a shift of only the virtual gear position. Here, it is determined whether the virtual gear position before the shift is any one of the virtual 1st-speed gear position, virtual 2nd-speed gear position, virtual 4th-speed gear position, virtual 5th-speed gear position, virtual 7th-speed gear position, and the virtual 8th-speed gear position, and the electric continuously variable transmission 16 is shifted up by one speed from one of these gear positions. Namely, in step ST3, it is determined whether no shift request for the mechanical gear position is generated.

If an affirmative decision (YES) is made in step ST3, the control proceeds to step ST4, and only the virtual gear position is shifted. Namely, the electric continuously variable transmission 16 is shifted (upshifted) by adjusting the engine speed through control of the first motor-generator MG1.

On the other hand, if a negative decision (NO) is made in step ST3, namely, if the shift request generated in this cycle is to request shifts of both the virtual gear position and the mechanical gear position, the control proceeds to step ST5. The case where the shifts of both of the virtual gear position and the mechanical gear position are requested is, specifically, the case where the virtual gear position before the shift is any one of the virtual 3rd-speed gear position, virtual 6th-speed gear position, and the virtual 9th-speed gear position, and the electric continuously variable transmission 16 is shifted up by one speed from one of these gear positions. Namely, it is the case where a shift request (upshift request) for the mechanical gear position is generated. In this case, shifts (upshifts) of both the virtual gear position and the mechanical gear position are carried out in step ST5. Namely, the electric continuously variable transmission 16 is shifted (upshifted) by adjusting the engine speed through control of the first motor-generator MG1, and the mechanical stepwise variable transmission 20 is shifted (upshifted) by switching engaged and released states of the clutches C and the brakes B via the linear solenoid valves SL1-SL4. On the other hand, if it is determined that the shift request is not an upshift request, namely, it is a downshift request, and a negative decision (NO) is made in step ST2, the control proceeds to step ST6, to determine whether the shift request of this cycle is to request a shift of only the virtual gear position. Here, it is determined whether the virtual gear position before the shift is any one of the virtual 10th-speed gear position, virtual 8th-speed gear position, virtual 7th-speed gear position, virtual 5th-speed gear position, virtual 4th-speed gear position, and the virtual 2nd-speed gear position, and the electric continuously variable transmission 16 is shifted down by only one speed from one of these gear positions. Namely, it is determined whether no shift request for the mechanical gear position is generated.

If an affirmative decision (YES) is made in step ST6, the control proceeds to step ST7, in which a shift of only the virtual gear position is carried out. Namely, the electric continuously variable transmission 16 is shifted (downshifted) by adjusting the engine speed through control of the first motor-generator MG1.

On the other hand, if a negative decision (NO) is obtained in step ST6, namely, if the shift request of this cycle is to request shifts of both the virtual gear position and the mechanical gear position, the control proceeds to step ST8. The case where the shifts of both the virtual gear position and the mechanical gear position are requested is, specifically, the case where the virtual gear position before the shift is any one of the virtual 9th-speed gear position, virtual 6th-speed gear position, and the virtual 3rd-speed gear position, and the electric continuously variable transmission 16 is shifted down by only one speed from one of these gear positions. Namely, it is the case where a shift request (downshift request) for the mechanical gear position is generated. In this case, shifts (downshifts) of both the virtual gear position and the mechanical gear position are carried out in step ST8. Namely, the electric continuously variable transmission 16 is shifted (downshifted) by adjusting the engine speed through control of the first motor-generator MG1, and the mechanical stepwise variable transmission 20 is shifted (downshifted) by switching engaged and released states of the clutches C and the brakes B via the linear solenoid valves SL1-SL4.

With the shift control as described above thus performed, a shift control system according to this disclosure is realized by a program executed by the electronic control unit 60.

Figure 10:
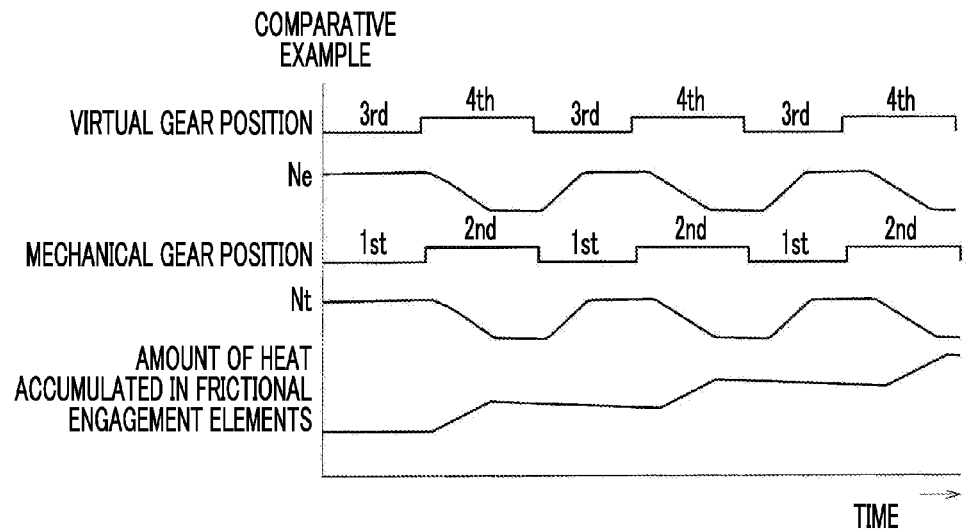
FIG. 10 is a timing chart showing one example of changes of each gear position, rotational speed of each rotating element, and the amount of heat accumulated in frictional engagement elements, with time, in a comparative example.
Figure 11:
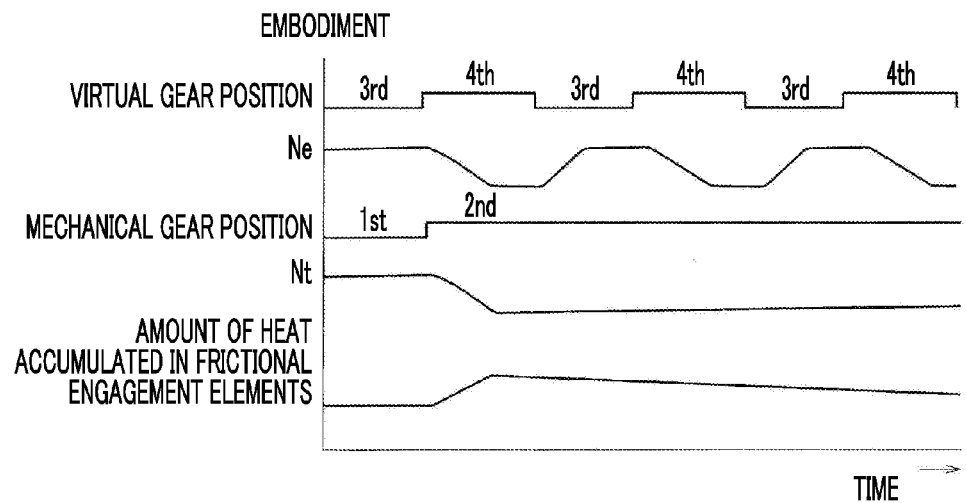
FIG. 11 is a timing chart showing one example of changes of each gear position, rotational speed of each rotating element, and the amount of heat accumulated in frictional engagement elements, with time, in the first embodiment.

FIG. 10 is a timing chart showing one example of changes of each of the virtual gear position and the mechanical gear position, the rotational speed of each rotating element, and the amount of heat accumulated in the frictional engagement elements, with time, in a comparative example. In the comparative example, the virtual gear positions assigned to each mechanical gear position when the mechanical gear position is upshifted are identical with the virtual gear positions assigned to each mechanical gear position when the mechanical gear position is downshifted. FIG. 11 is a timing chart showing one example of changes of each of the virtual gear position and the mechanical gear position, the rotational speed of each rotating element, and the amount of heat accumulated in the frictional engagement elements, with time, in the case where the virtual gear positions assigned to each mechanical position when the mechanical gear position is upshifted are different from the virtual gear positions assigned to each mechanical gear position when the mechanical gear position is downshifted, as in this embodiment. In FIG. 10 and FIG. 11, Ne denotes the engine speed, and Nt denotes the rotational speed of a rotating element whose speed changes upon a shift of the mechanical gear position.

In the comparative example (FIG. 10), when the virtual gear position is repeatedly shifted between two gear positions (the virtual 3rd-speed gear position and the virtual 4th-speed gear position in the example of FIG. 10) (when upshift and downshift are repeated in a short time), upshift and downshift of the mechanical gear position are also repeated in a short time, in association with those of the virtual gear position (i.e., the mechanical gear position is repeatedly shifted between the mechanical 1st-speed gear position and the mechanical 2nd-speed gear position in the example of FIG. 10). Since upshift and downshift of the mechanical gear position are repeated in a short time, engagement and release of the frictional engagement elements (brakes B1, B2) are repeated in a short time, and the amount of heat accumulated in the frictional engagement elements is increased.

On the other hand, in this embodiment (FIG. 11), even when the virtual gear position is repeatedly shifted between two gear positions (the virtual 3rd-speed gear position and the virtual 4th-speed gear position in the example of FIG. 11) (when upshift and downshift are repeated in a short time), the mechanical gear position is not shifted in association with upshift and downshift of the virtual gear position (i.e., the mechanical 2nd-speed gear position is maintained). Namely, engagement and release of the frictional engagement elements are not repeated in a short time, and the amount of heat accumulated in the frictional engagement elements can be prevented from being increased. Consequently, the durability of the frictional engagement elements is favorably kept high.

Next, a second embodiment will be described. In the first embodiment, in both of the automatic shift mode and the manual shift mode, the virtual gear positions assigned to each mechanical gear position when the mechanical gear position is upshifted are different from the virtual gear positions assigned to each mechanical gear position when the mechanical gear position is downshifted. In this embodiment, in the automatic shift mode, the virtual gear positions assigned to each mechanical gear position when the mechanical gear position is upshifted are identical with the virtual gear positions assigned to each mechanical gear position when the mechanical gear position is downshifted. On the other hand, in the manual shift mode, the virtual gear positions assigned to each mechanical gear position when the mechanical gear position is upshifted are different from the virtual gear positions assigned to each mechanical gear position when the mechanical gear position is downshifted.

FIG. 12 shows a gear position assignment table selected when the vehicular drive system 10 is in the automatic shift mode. As shown in FIG. 12, in the gear position assignment table selected in the automatic shift mode, on both upshifts and downshifts of the vehicular drive system 10, the virtual 1st-speed gear position to the virtual 3rd-speed gear position are established with respect to the mechanical 1st-speed gear position, and the virtual 4th-speed gear position to the virtual 6th-speed gear position are established with respect to the mechanical 2nd-speed gear position, while the virtual 7th-speed gear position to the virtual 9th-speed gear position are established with respect to the mechanical 3rd-speed gear position, and the virtual 10th-speed gear position is established with respect to the mechanical 4th-speed gear position. The gear position assignment table (including the upper section for upshifts in the automatic shift mode and the lower section for downshifts in the automatic shift mode) of FIG. 12 is stored in advance in the data storage unit 90. Each of the virtual gear position and the mechanical gear position selected in the automatic shift mode is not limited to the one determined according to the gear position assignment table, but may be determined according to the shift map as described above.

In the meantime, FIG. 13 shows a gear position assignment table selected when the vehicular drive system 10 is in the manual shift mode. As shown in FIG. 13, in the gear position assignment table selected in the manual shift mode, on upshifts of the vehicular drive system 10, the virtual 1st-speed gear position to the virtual 3rd-speed gear position are established with respect to the mechanical 1st-speed gear position, and the virtual 4th-speed gear position to the virtual 6th-speed gear position are established with respect to the mechanical 2nd-speed gear position. Also, the virtual 7th-speed gear position to the virtual 9th-speed gear position are established with respect to the mechanical 3rd-speed gear position, and the virtual 10th-speed gear position is established with respect to the mechanical 4th-speed gear position.

On downshifts of the vehicular drive system 10, the virtual 1st-speed gear position and the virtual 2nd-speed gear position are established with respect to the mechanical 1st-speed gear position, and the virtual 3rd-speed gear position to the virtual 5th-speed gear position are established with respect to the mechanical 2nd-speed gear position. Also, the virtual 6th-speed gear position to the virtual 8th-speed gear position are established with respect to the mechanical 3rd-speed gear position, and the virtual 9th-speed gear position and the virtual 10th-speed gear position are established with respect to the mechanical 4th-speed gear position. The gear position assignment table (including the upper section for upshifts in the manual shift mode and the lower section for downshifts in the manual shift mode) of FIG. 13 is also stored in advance in the data storage unit 90.

Thus, in this embodiment, in the automatic shift mode, the virtual gear positions assigned to each mechanical gear position when the mechanical gear position is upshifted are identical with the virtual gear positions assigned to each mechanical gear position when the mechanical gear position is downshifted. On the other hand, in the manual shift mode, the virtual gear positions assigned to each mechanical gear position when the mechanical gear position is upshifted are different from the virtual gear positions assigned to each mechanical gear position when the mechanical gear position is downshifted.

Generally, in the automatic shift mode, a demand for improvement of the fuel consumption rate is high. In the manual shift mode, on the other hand, high traveling performance of the vehicle is requested.

In the automatic shift mode, the vehicular drive system 10 is shifted according to the amount of driver's operation of the accelerator pedal, etc. In this case, however, upshift and downshift of the virtual gear position are less likely or unlikely to be repeated in a short time. Therefore, in the automatic shift mode, the virtual gear positions assigned to each mechanical gear position when the mechanical gear position is upshifted are made identical with the virtual gear positions assigned to each mechanical gear position when the mechanical gear position is downshifted. Thus, shift conditions for each gear position are set so that high fuel economy performance is obtained on both upshifts and downshifts.

On the other hand, in the manual shift mode, the shift lever 48 may be frequently operated (for selection of the gear position) by the driver. In this case, upshift and downshift of the virtual gear position may be repeated in a short period of time. Therefore, in the manual shift mode, the virtual gear positions assigned to each mechanical gear position when the mechanical gear position is upshifted are made different from the virtual gear positions assigned to each mechanical gear position when the mechanical gear position is downshifted. Thus, the amount of heat generated in the frictional engagement elements of the mechanical stepwise variable transmission 20 is prevented from being increased, and the durability of the frictional engagement elements can be kept high, as in the case of the first embodiment as described above.

Thus, in this embodiment, improvement of the fuel consumption rate in the automatic shift mode, and assurance of the durability of the frictional engagement elements in the manual shift mode, can be both achieved.

In this embodiment, the virtual gear positions assigned to each mechanical gear position on downshifts of the mechanical gear position, in the automatic shift mode, are made different from the virtual gear positions assigned to each mechanical gear position on downshifts of the mechanical gear position, in the manual shift mode. The manner of assignment of the virtual gear positions is not limited to this, but the vertical gear positions assigned to each mechanical gear position on upshifts of the mechanical gear position, in the automatic shift mode, may be made different from the vertical gear positions assigned to each mechanical gear position on upshifts of the mechanical gear position, in the manual shift mode.

Thus, in this embodiment, third given virtual gear positions are made different from those of fourth given virtual gear positions on at least one of upshift and downshift of the mechanical gear position. The third given virtual gear positions are virtual gear positions assigned to each mechanical gear position on each of upshift and downshift of the mechanical gear position in the automatic shift mode. The fourth given virtual gear positions are virtual gear positions assigned to each mechanical gear position on each of upshift and downshift of the mechanical gear position in the manual shift mode.

In this embodiment, in the automatic shift mode, the virtual gear positions assigned to each mechanical gear position on upshifts of the mechanical gear position are made identical with the virtual gear positions assigned to each mechanical gear position on downshifts of the mechanical gear position. The manner of assignment of the virtual gear positions is not limited to this, but, even in the automatic shift mode, the virtual gear positions assigned to each mechanical gear position on upshifts of the mechanical gear position may be made different from the virtual gear positions assigned to each mechanical gear position on downshifts of the mechanical gear position, as in the manual shift mode. In this case, too, the third given virtual gear positions are made different from those of the fourth given virtual gear positions on at least one of upshift and downshift of the mechanical gear position.

Next, a third embodiment will be described. In this embodiment, the gear position assignment table is changed, relative to that of the first embodiment.

FIG. 14 shows a gear position assignment table selected in the automatic shift mode. As shown in FIG. 14, in the gear position assignment table selected in the automatic shift mode, no virtual gear position is assigned to the mechanical 1st-speed gear position when the vehicular drive system 10 is upshifted. Namely, the mechanical 1st-speed gear position is not established in the automatic shift mode. Then, the virtual 1st-speed gear position to the virtual 6th-speed gear position are established with respect to the mechanical 2nd-speed gear position, and the virtual 7th-speed gear position to the virtual 9th-speed gear position are established with respect to the mechanical 3rd-speed gear position, while the virtual 10th-speed gear position is established with respect to the mechanical 4th-speed gear position.

With regard to downshifts of the vehicular drive system 10, too, no virtual gear position is assigned to the mechanical 1st-speed gear position. Namely, the mechanical 1st-speed gear position is not established. Then, the virtual 1st-speed gear position to the virtual 5th-speed gear position are established with respect to the mechanical 2nd-speed gear position, and the virtual 6th-speed gear position to the virtual 8th-speed gear position are established with respect to the mechanical 3rd-speed gear position, while the virtual 9th-speed gear position and the virtual 10th-speed gear position are established with respect to the mechanical 4th-speed gear position. The gear position assignment table of FIG. 14 is also stored in advance in the data storage unit 90. Each gear position selected in the automatic shift mode is not limited to that determined according to the gear position assignment table, but may be determined according to a shift map as described above.

Thus, the mechanical 1st-speed gear position is not established in the automatic shift mode, so that the vehicle does not travel in a condition where the speed ratio $\gamma 0$ ($=\gamma 1 \times \gamma 2$) of the engine speed Ne to the output rotational speed Nout is extremely large. Thus, when the vehicular drive system 10 is in the automatic shift mode, high fuel economy performance can be obtained.

In the meantime, FIG. 15 is a gear position assignment table selected in the manual shift mode. As shown in FIG. 15, in the gear position assignment table selected in the manual shift mode, on upshifts of the vehicular drive system 10, the virtual 1st-speed gear position to the virtual 3rd-speed gear position are established with respect to the mechanical 1st-speed gear position, and the virtual 4th-speed gear position to the virtual 6th-speed gear position are established with respect to the mechanical 2nd-speed gear position, while the virtual 7th-speed gear position to the virtual 10th-speed gear position are established with respect to the mechanical 3rd-speed gear position. Namely, no virtual gear position is assigned to the mechanical 4th-speed gear position, and the mechanical 4th-speed gear position is not established in the manual shift mode.

Also, on downshifts of the vehicular drive system 10, the virtual 1st-speed gear position and the virtual 2nd-speed gear position are established with respect to the mechanical 1st-speed gear position, and the virtual 3rd-speed gear position to the virtual 5th-speed gear position are established with respect to the mechanical 2nd-speed gear position, while the virtual 6th-speed gear position to the virtual 10th-speed gear position are established with respect to the mechanical 3rd-speed gear position. Namely, no virtual gear position is assigned to the mechanical 4th-speed gear position, and the mechanical 4th-speed gear position is not established.

Thus, the mechanical 4th-speed gear position is not established in the manual shift mode, so that the vehicle does not travel in a condition where the speed ratio $\gamma 0$ ($=\gamma 1 \times \gamma 2$) of the engine speed Ne to the output rotational speed Nout is extremely small. Thus, when the vehicular drive system 10 is in the manual shift mode, high traveling performance of the vehicle can be realized.

Each of the above embodiments is exemplary in all respects, and does not provide any basis for restrictive interpretation. Accordingly, the technical scope of this disclosure is not to be interpreted only based on the above embodiments, but is defined based on the appended claims. Also, the technical scope of this disclosure includes all changes within the meaning and scope of the claims and equivalents thereof.

For example, while the disclosure is applied to the FR (front-engine, rear-drive) vehicle in each of the above embodiments, the disclosure may be applied to an FF (front-engine, front-drive) vehicle, or a four-wheel-drive vehicle.

In each of the above embodiments, the virtual gear positions assigned to a given mechanical gear position on upshifts are shifted only by one speed from the virtual gear positions assigned to the given mechanical gear position on downshifts. This disclosure is not limited to this arrangement, but the virtual gear positions assigned for upshifts may be shifted by two or more speeds from the virtual gear positions assigned for downshifts. Also, while the virtual gear positions assigned for downshifts are shifted to the side (low-gear side) having the larger speed ratio, relative to the virtual gear positions assigned for upshifts, in the above embodiments, the virtual gear positions assigned for downshifts may be shifted to the side (high-gear side) having the smaller speed ratio, relative to the virtual gear positions assigned for upshifts.

This disclosure may be applied to a vehicle including a power transmission system in which an electric continuously variable transmission and a mechanical stepwise variable transmission are connected in series.

What is claimed is:

1. A hybrid vehicle comprising:
a power transmission system including
an electric continuously variable transmission configured to steplessly change a rotational speed of a drive source by torque control of a differential rotating machine, and transmit a changed rotational speed of the drive source to an intermediate transmission member, and
a mechanical stepwise variable transmission that includes frictional engagement elements, the mechanical stepwise variable transmission being disposed between the intermediate transmission member and drive wheels of the hybrid vehicle, the mechanical stepwise variable transmission being configured to mechanically establish a plurality of mechanical gear positions by selectively switching engagement and release of the frictional engagement elements, the plurality of mechanical gear positions being gear positions that have different ratios of a rotational speed of the intermediate transmission member to an output rotational speed, the power transmission system being configured such that the electric continuously variable transmission and the mechanical stepwise variable transmission are connected in series; and an electronic control unit configured to control the electric continuously variable transmission such that one virtual gear position selected from a plurality of virtual gear positions is established according to predetermined virtual gear position shift conditions, the plurality of virtual gear positions being gear positions that have different ratios of a rotational speed of the drive source to the rotational speed of the intermediate transmission member, the electronic control unit being configured to selectively switch engagement and release of the frictional engagement elements such that one mechanical gear position selected from the plurality of mechanical gear positions is established according to predetermined mechanical gear position shift conditions, and the number of speeds of the plurality of virtual gear positions being equal to or larger than the number of speeds of the plurality of mechanical gear positions, at least one virtual gear position being assigned to each of the mechanical gear positions, the mechanical gear position shift conditions of each of the mechanical gear positions being identical with the virtual gear position shift conditions of one of the plurality of virtual gear positions, a first given virtual gear position being different from a second given virtual gear position, the first given virtual gear position being a virtual gear position that is assigned to each mechanical gear position when the mechanical gear position is upshifted, the second given virtual gear position being a virtual gear position that is assigned to each mechanical gear position when the mechanical gear position is downshifted.

2. The hybrid vehicle according to claim 1, wherein a fourth given virtual gear position is set to a virtual gear position having a speed ratio that is smaller by one speed than a third given virtual gear position, the third given virtual gear position is a virtual gear position having the largest speed ratio, in a group of the virtual gear positions assigned to a given mechanical gear position when the mechanical gear position is downshifted, the fourth given virtual gear position is a virtual gear position having the largest speed ratio, in a group of the virtual gear positions assigned to the given mechanical gear position when the mechanical gear position is upshifted, the group of virtual gear positions include at least one virtual gear position assigned to the given mechanical gear position.

3. The hybrid vehicle according to claim 1, wherein the electronic control unit is configured to switch the power transmission system between an automatic shift mode and a manual shift mode, the automatic shift mode is a mode in which the virtual gear position is automatically changed according to traveling conditions of the hybrid vehicle, the manual shift mode is a mode in which the virtual gear position is changed according to a gear position selecting operation of a driver of the hybrid vehicle, the first given virtual gear position in the automatic shift mode is different from the first given virtual gear position in the manual shift mode.

4. The hybrid vehicle according to claim 1, wherein the electronic control unit is configured to switch the power transmission system between an automatic shift mode and a manual shift mode, the automatic shift mode is a mode in which the virtual gear position is automatically changed according to traveling conditions of the hybrid vehicle, the manual shift mode is a mode in which the virtual gear position is changed according to a gear position selecting operation of a driver of the hybrid vehicle, the second given virtual gear position in the automatic shift mode is different from the second given virtual gear position in the manual shift mode.

5. The hybrid vehicle according to claim 1, wherein the electronic control unit is configured to control the mechanical stepwise variable transmission such that the mechanical gear position is upshifted when the electric continuously variable transmission is shifted up from a predetermined virtual gear position, and the electronic control unit is configured to control the electric continuously variable transmission such that only the virtual gear position is downshifted when the electric continuously variable transmission is shifted down to the predetermined virtual gear position.

6. The hybrid vehicle according to claim 5, wherein:
the electronic control unit is configured to switch the power transmission system between an automatic shift mode and a manual shift mode, the automatic shift mode is a mode in which the virtual gear position is automatically changed according to traveling conditions of the hybrid vehicle, the manual shift mode is a mode in which the virtual gear position is changed according to a gear position selecting operation of a driver of the hybrid vehicle; and when the electronic control unit controls the mechanical stepwise variable transmission such that the mechanical gear position is upshifted when the electric continuously variable transmission is shifted up from the predetermined virtual gear position in the automatic shift mode, the electronic control unit is configured not to execute a control in which the mechanical stepwise variable transmission is controlled such that the mechanical gear position is upshifted even when the electric continuously variable transmission is shifted up from the predetermined virtual gear position in the manual shift mode.

7. The hybrid vehicle according to claim 5, wherein:
the electronic control unit is configured to switch the power transmission system between an automatic shift mode and a manual shift mode, the automatic shift mode is a mode in which the virtual gear position is automatically changed according to traveling conditions of the hybrid vehicle, the manual shift mode is a mode in which the virtual gear position is changed according to a gear position selecting operation of a driver of the hybrid vehicle; and when the electronic control unit controls the mechanical stepwise variable transmission such that the mechanical gear position is downshifted when the electric continuously variable transmission is shifted down to the predetermined virtual gear position in the automatic mode, the electronic control unit is configured not to execute a control in which the mechanical stepwise variable transmission is controlled such that the mechanical gear position is downshifted even when the electric continuously variable transmission is shifted down to the predetermined virtual gear position in the manual shift mode.

\* \* \* \* \*